US012641305B2

(12) United States Patent (10) Patent No.: US 12,641,305 B2
Concolato (45) Date of Patent: May 26, 2026

(54) TECHNIQUES FOR PERFORMING LIVE CAPTIONING

(71) Applicant: NETFLIX, INC., Los Gatos, CA (US)

(72) Inventor: Cyril Concolato, Palo Alto, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 18/741,605

(22) Filed: Jun. 12, 2024

(65) Prior Publication Data

US 2025/0324117 A1     Oct. 16, 2025

Related U.S. Application Data

(60) Provisional application No. 63/633,338, filed on Apr. 12, 2024.

(51) Int. Cl.
| | |
|---|---|
| *H04N 21/236* | (2011.01) |
| *H04N 21/2187* | (2011.01) |
| *H04N 21/232* | (2011.01) |
| *H04N 21/488* | (2011.01) |

(52) U.S. Cl.
CPC ... *H04N 21/23614* (2013.01); *H04N 21/2187* (2013.01); *H04N 21/232* (2013.01); *H04N 21/4884* (2013.01)

(58) Field of Classification Search
CPC ......... H04N 21/23614; H04N 21/2187; H04N 21/232; H04N 21/4884
See application file for complete search history.

(56) References Cited

U.S. PATENT DOCUMENTS

| | | |
|---|---|---|
| 2016/0295293 A1 | 10/2016 | McLaughlin |
| 2020/0051582 A1 | 2/2020 | Gilson |
| 2024/0107096 A1 | 3/2024 | Loheide et al. |

FOREIGN PATENT DOCUMENTS

| | | | |
|---|---|---|---|
| CN | 113994424 | * | 1/2022 |
| CN | 117376593 | * | 1/2024 |
| JP | 2023-105359 A | | 7/2023 |

OTHER PUBLICATIONS

International Search Report for Application No. PCT/US2025/024022 dated Jul. 2, 2025.
"Hybrid Broadcast Broadband TV", Technical Specification, ETSI TS 102 796 v1.7.1, vol. JTC BROADCAS EBU/CENELEC/ETSI on Broadcasting, XP014449644, No. 1.6.2, Jun. 2023, pp. 1-421.

* cited by examiner

*Primary Examiner* — Nnenna N Ekpo
(74) *Attorney, Agent, or Firm* — Artegis Law Group, LLP

(57)     ABSTRACT

In various embodiments, a caption encoding application performs captioning while streaming live events. The caption encoding application determines a segment index in response to a triggering event associated with a live event. The caption encoding application computes a caption time interval based on the first triggering event and a caption delay. The caption encoding application retrieves from a database a portion of caption data based on the caption time interval and a language. The caption encoding application generates a caption segment based on the portion of the caption data. The caption encoding application causes the caption segment to be inserted into a caption stream at the segment index, where the caption stream is to be transmitted as part of the live event.

20 Claims, 3 Drawing Sheets

TECHNIQUES FOR PERFORMING LIVE CAPTIONING

CROSS-REFERENCE TO RELATED APPLICATIONS

This application claims priority benefit of the U.S. Provisional Patent Application titled "TECHNIQUES FOR LIVE CAPTIONING PROCESSING," filed on Apr. 12, 2024, and having Ser. No. 63/633,338. The subject matter of this related application is hereby incorporated herein by reference.

BACKGROUND

Field of the Various Embodiments

The various embodiments relate generally to computer science and to video and media streaming technology and, more specifically, to techniques for performing live captioning.

Description of the Related Art

In some approaches to streaming a live event, different streams are incrementally generated based on a live audio/video feed. Each "stream" constitutes a different encoded version of video data, audio data, or caption data corresponding to the audio/video feed. As discrete portions or "segments" of each stream are generated, the segments are stored in a content delivery network (CDN) of servers and subsequently streamed to various client devices on-demand. In "live captioning," caption stream(s) are synchronized to video streams and audio streams to allow a client device to display captions while playing back corresponding video and audio data to a user.

In one approach to live captioning, a specialized hardware device known as a "hardware caption encoder" is deployed in a production truck that is usually geographically proximate to a live event. Throughout the live event, the hardware caption encoder relays a low-latency version of a live audio/video feed to a remote captioning service for captioning encoding. The captioning service, upon receiving the low-latency audio/video feed, incrementally generates and transmits to the hardware caption encoder caption data in one or more languages that corresponds to different portions of the received audio/video feed. The hardware caption encoder delays transmitting the live audio/video feed for distribution encoding until the caption data is received from the captioning service to allow the caption data to be synchronized to the delayed audio/video feed. Once the caption data is received, the hardware caption encoder transmits the caption data and the delayed audio/video feed to a cloud-based distribution encoder. The distribution encoder performs distribution encoding on the delayed audio/video feed across different encoding parameters to generate segments of audio and video streams. Some examples of encoding parameters are resolution, bitrate, and language. The distribution encoder also partitions the caption data into corresponding segments of caption streams.

One drawback of the above approach is that the critical path for streaming a live event includes caption encoding followed by distribution encoding. Consequently, delays between when actions occur during the live event and when those actions are played back on a client device can be substantial. More specifically, the resulting "live streaming latency" includes the sum of transmission delays to and from the captioning service, a caption encoding delay, a transmission delay to the distribution encoder, and a distribution encoding delay.

Another drawback of the above approach is that a typical hardware caption encoder supports only a few, relatively inflexible caption standards. As a result, both the number and types of languages for which live captioning is performed can be severely limited. For example, some popular hardware caption encoders limit live captioning to no more than two or four Latin languages when streaming any given live event and do not support non-Latin languages.

As the foregoing illustrates, what is needed in the art are more effective techniques for performing live captioning.

SUMMARY

One embodiment sets forth a computer-implemented method for performing captioning while streaming live events. The method includes determining a first segment index in response to a first triggering event associated with a first live event; computing a first caption time interval based on the first triggering event and a first caption delay; retrieving from a database a first portion of caption data based on the first caption time interval and a first language; generating a first caption segment based on the first portion of the caption data; and causing the first caption segment to be inserted into a first caption stream at the first segment index, where the first caption stream is to be transmitted as part of the first live event.

At least one technical advantage of the disclosed techniques relative to the prior art is that, with the disclosed techniques, caption encoding and distribution encoding are performed concurrently instead of sequentially, which can substantially reduce overall "live streaming latency." Notably, the amount of time required to perform caption encoding for a given portion of a live audio/video feed is usually less than the amount of time required to perform distribution encoding for that same portion of live audio/video feed. Accordingly, with the disclosed techniques, caption encoding can be effectively removed from the critical path of streaming a live event, thereby reducing live streaming latency relative to the latencies experienced using prior art techniques. Another technical advantage of the disclosed techniques relative to the prior art is that the disclosed techniques do not rely on hardware caption encoders and can therefore support additional, more flexible caption standards. As a result, with the disclosed techniques, live captioning can be performed for a larger number of Latin and/or non-Latin languages, when streaming live events. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
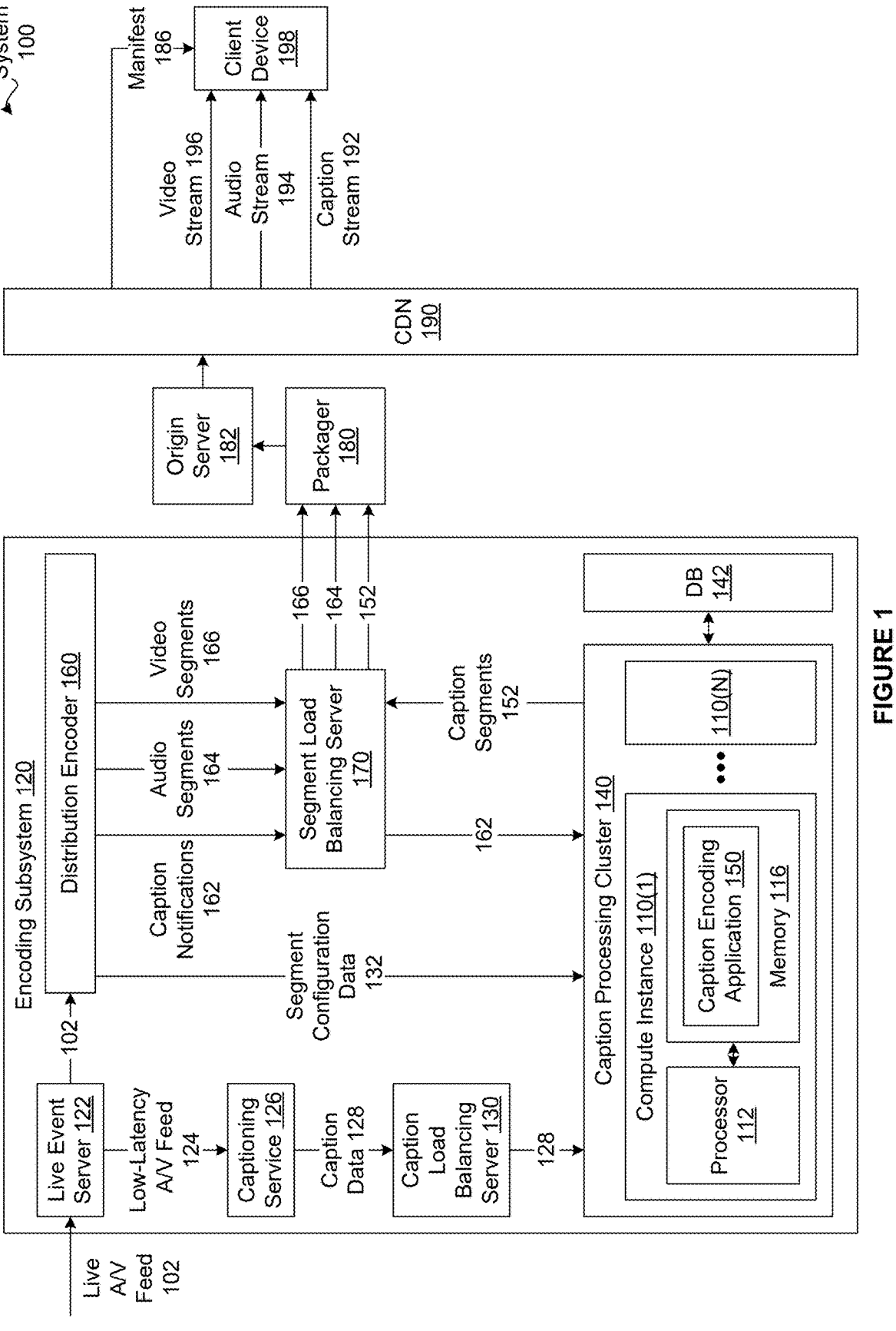
FIG. 1 is a conceptual illustration of a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details. For explanatory purposes, multiple instances of like objects are symbolized with reference numbers identifying the object and parenthetical numbers(s) identifying the instance where needed.

To increase an overall quality of experience for a wide variety of users when streaming a live event, a streaming media provider can perform live captioning. In live captioning, segments of caption stream(s) are synchronized to segments of video streams and segments of audio streams throughout a live event to allow a client device to display captions while playing back corresponding video and audio data to a user. Each "stream" constitutes a different encoded version of video data, audio data, or caption data corresponding to the live event.

In one conventional approach to live captioning during a live event, a hardware caption encoder is deployed in a production truck that is close to the location of the live event. Throughout the live event, the hardware caption encoder uses a remote captioning service to generate caption data in one or more languages based on a live audio/visual feed. The hardware caption encoder delays transmitting the live audio/visual feed to a cloud-based distribution encoder such that the caption data received from the captioning service is synchronized to the delayed audio/video feed. The distribution encoder performs distribution encoding on the delayed audio/video feed across different encoding parameters to generate segments of audio and video streams. The distribution encoder also partitions the caption data into corresponding segments of caption streams.

One drawback to the above approach is that because caption encoding is followed by distribution encoding, the resulting live streaming latency includes significant delays attributable to caption encoding as well as significant delays attributable to distribution encoding. As a result, delays between when actions occur during the live event and when those actions are played back on a client device can be pronounced. Another drawback of the above approach is that a typical hardware caption encoder supports only a few, relatively inflexible caption standards. As a result, live captioning can often be performed for only a few Latin languages and no non-Latin languages.

With the disclosed techniques, however, caption encoding and distribution encoding are performed concurrently instead of sequentially. In one embodiment, a live event server concurrently relays a live A/V feed to a cloud-based distribution encoder and a low-latency version of the live A/V feed to a captioning service. The distribution encoder performs distribution encoding across a variety of encoding parameters to generate segments of audio and video streams that are characterized by different combinations of bitrates and resolutions. The distribution encoder also generates empty segments of one or more caption stream(s) and transmits the empty caption segments to a caption processing cluster.

While the distribution encoder is performing distribution encoding on the live A/V feed, a captioning service is generating caption data based on the low-latency version of the live A/V feed. The captioning service relays the caption data to the caption processing cluster. The caption processing cluster stores the caption data in a database. Upon receiving each empty caption segment, the captioning service retrieves the corresponding portion of caption data from the database and generates a segment of a caption stream that is synchronized with corresponding segment(s) of video stream(s) and audio stream(s).

At least one technical advantage of the disclosed techniques relative to the prior art is that, performing caption encoding and distribution encoding concurrently instead of sequentially can substantially reduce live streaming latency. In that regard, the amount of time required to perform caption encoding for a given portion of a live audio/video feed is usually less than the amount of time required to perform distribution encoding for that same portion of live audio/video feed. Accordingly, caption encoding can be effectively removed from the critical path of streaming a live event. As a result, delays between when actions occur during the live event and when those actions are played back on a client device can be significantly reduced relative to delays experienced using prior art techniques. Another technical advantage of the disclosed techniques relative to the prior art is that the disclosed techniques do not rely on hardware caption encoders and can therefore support additional, more flexible caption standards. As a result, with the disclosed techniques, live captioning can be performed for a larger number of Latin and/or non-Latin languages. These technical advantages provide one or more technological advancements over prior art approaches.

System Overview

FIG. 1 is a conceptual illustration of a system 100 configured to implement one or more aspects of the various embodiments. As shown, in some embodiments, the system 100 includes, without limitation, an encoding subsystem 120, a packager 180, an origin server 182, a content delivery network (CDN) 190, and a client device 198. In some other embodiments, the system 100 can further include any number of other client devices.

Any number of the components of the system 100 can be distributed across multiple geographic locations. Any number of the components of the system 100 can be implemented in one or more cloud computing environments (e.g., encapsulated shared resources, software, data), implemented as part of any other distributed computing environment, implemented in a stand-alone fashion, or any combination thereof.

The system 100 is configured to perform live captioning while streaming a live event. As noted previously herein, in live captioning, caption stream(s) are synchronized to video streams and audio streams to allow a client device to display captions while playing back corresponding video and audio data to a user.

As shown, the encoding subsystem 120 generates video segments 166, audio segments 164, and caption segments 152 based on a live A/V feed 102 during a live event. The video segments 166 are discrete portions of one or more video streams, the audio segments 164 are discrete portions of one or more audio streams, and the caption segments 152 are discrete portions of one or more caption streams.

The packager 180 performs any number and/or types of packaging operations on the video segments 166, the audio segments 164, and the caption segments 152 to prepare the segments for delivery to the client device 198 and/or any number of other client devices via the CDN 190. Some examples of packaging operations include encrypting segments, applying digital rights management (DRM) to segments, and generating a manifest 186.

The manifest 186 describes one or more available streams that are generated in real-time during a live event. At any given point-in-time, the manifest 186 indicates the segments of each stream that are available for playback at that point-in-time. The manifest 186 provides instructions (e.g., based on the names of the segments) that can be used by the client device 198 and/or any number of other client devices to request available segments from the CDN 190.

The packager 180 relays the manifest 186 and "packaged" versions of the video segments 166, the audio segments 164, and the caption segments 152 to the origin server 182. The origin server 182 stores any number of manifests and segments of streams associated with any number of live events and optionally any number of media titles for on-demand delivery to the client device 198 and/or any number of other client devices via the CDN 190.

The CDN 190 delivers manifests and segments of streams on behalf of the origin server 182 to the client device 198 and/or any number of other client devices on-demand. The CDN 190 includes, without limitation, any number of and/or types of caching servers (not shown) that are each capable of selectively caching any portions (including all) of manifests and segments of streams.

Each of the client devices (including the client device 198) can be any type of device that is capable of communicating with the CDN 190 and displaying captions while playing back corresponding video and audio data to a user. Some examples of client devices include, without limitation, desktop computers, laptops, smartphones, smart televisions, game consoles, and tablets.

As shown, in some embodiments, the client device 198 streams a video stream 196, an audio stream 194, and a caption stream 192 for a live event from the CDN 190 based on the manifest 186 provided by the CDN 190.

As described previously herein, in a conventional approach to live captioning during a live event, a conventional encoding subsystem includes a hardware caption encoder that is deployed in a production truck, a remote captioning service, and a cloud-based distribution encoder. Throughout the live event, the hardware caption encoder uses the remote captioning service to generate caption data in one or more languages based on a low-latency version of a live audio/visual feed. The hardware caption encoder delays transmitting the live audio/video feed to the distribution encoder until the caption data is received from the captioning service to allow the caption data to be synchronized to the delayed audio/video feed. The distribution encoder performs distribution encoding on the delayed audio/video feed across different encoding parameters to generate segments of audio and video streams. The distribution encoder also partitions the caption data into corresponding segments of caption streams.

One drawback of the above approach is that the critical path for streaming a live event includes caption encoding followed by distribution encoding. Consequently, the resulting live streaming latency can be significant and delays between when actions occur during the live event and when those actions are played back on a client device can therefore be substantial. Another drawback of the above approach is that a typical hardware caption encoder supports only a few, relatively inflexible caption standards. As a result, both the number and types of languages for which live captioning is performed can be severely limited.

Concurrently Performing Contribution Encoding and Caption Encoding

To address the above problems, in some embodiments, the encoding subsystem 120 performs caption encoding and distribution encoding concurrently instead of sequentially while the system 100 is performing live captioning. Notably, performing caption encoding and distribution encoding concurrently instead of sequentially can substantially reduce overall live streaming latency.

For explanatory purposes, the functionality of the encoding subsystem 120 is described herein in the context of generating segments of one or more video streams, one or more audio streams, and one or more caption streams based on the live audio/video (A/V) feed 102. Note, however, that the techniques described herein are illustrative rather than restrictive. Many modifications and variations will be apparent to those of ordinary skill in the art without departing from the scope and spirit of the described embodiments and techniques. For instance, in some other embodiments, the encoding subsystem 120 generates any number and/or types of streams based on any number of live A/V feeds associated with any number of live events, and the techniques described herein are modified accordingly.

As shown, the encoding subsystem 120 generates video segments 166, audio segments 164, and caption segments 152 based on the live A/V feed 102. The live A/V feed 102 delivers audio data and video data that is associated with a live event in real-time. More specifically, the live A/V feed 102 delivers in real-time audio data and video data that is recorded (e.g., by a camera) during the live event. Some examples of live events are a live sporting event, a live television show, a live performance, a live speech, and a live meeting.

For explanatory purposes, a "segment" as used herein refers to a segment of a stream. The video segments 166 are segments of one or more video streams, the audio segments 164 are segments of one or more audio streams, and the caption segments 152 are segments of one or more caption streams. As referred to herein, a "stream" is an encoded version of any type of media data. Some examples of different types of media data are video data, audio data, and caption data.

As used herein "caption data" refers to textual data that a client device can display while playing back corresponding video and audio data to a user. Some examples of types of caption data are subtitles, closed captions, and forced narratives. Subtitles are a transcription or translation of spoken dialogue. Closed captions are a transcription or translation of the spoken dialogue of a media title and describe relevant non-verbal sounds as well as various audio cues (e.g., speaker identification). Forced narratives are text overlays that clarify communications or alternate languages meant to be understood by a user. Forced narratives are also commonly referred to as "forced narrative subtitles" and forced "subtitles."

Each stream that is derived from the live A/V feed 102 includes, without limitation, a sequence of one or more discrete, time-based segments that correspond (in a playback timeline) to a sequence of one or more portions of the live A/V feed 102. For explanatory purposes, the one or more portions of the live A/V feed 102 in the sequence are also referred to herein individually as a "source portion" and collectively as "source portions."

Each of the source portions corresponds to a different segment index, where the segment index indicates the position of the source portion within the playback timeline relative to the other source portions. For instance, in some embodiments, the source portion that starts at the beginning of the live event corresponds to a segment index of 1, the next source portion corresponds to a segment index of 2. etc.

Each segment of each audio, video, and caption stream derived from a given source portion of the live A/V feed 102 indicates the segment index of that same source portion. Importantly, segments of different streams derived from the same live A/V feed (e.g., the live A/V feed 102) that indicate the same segment index correspond to the same time interval in the same playback timeline.

A segment of a stream can indicate a segment index in any technically feasible fashion. For instance, in some embodiments, a name of a segment of a stream indicates a corresponding segment index and optionally any amount and/or types of additional metadata (e.g., a language, an encoding parameter). In some other embodiments, a segment can include any amount and/or type of metadata that indicates a corresponding segment index and optionally any amount and/or types of additional metadata.

As shown, in some embodiments, the encoding subsystem 120 includes, without limitation, a live event server 122, a distribution encoder 160, a segment load balancing server 170, a captioning service 126, a caption load balancing server 130, a caption processing cluster 140, and a database (DB) 142. Any number of the components of the encoding subsystem 120 can be distributed across multiple geographic locations. Any number of the components of the encoding subsystem 120 can be implemented in one or more cloud computing environments (e.g., encapsulated shared resources, software, data), implemented as part of any other distributed computing environment, implemented in a stand-alone fashion, or any combination thereof.

As shown, the caption processing cluster 140 includes, without limitation, a compute instance 110(1)—a compute instance 110(N), where N can be any positive integer. For explanatory purposes, the compute instance 110(1)—the compute instance 110(N) are also referred to herein individually as "the compute instance 110" and collectively as "the compute instances 110."

Although not shown, in some embodiments, any number of other compute instances can be configured to implement the live event server 122, the captioning service 126, the distribution encoder 160, the segment load balancing server 170, the caption load balancing server 130, or any combination thereof. Each compute instance (including the compute instances 110) can be implemented in a cloud computing environment, implemented as part of any other distributed computing environment, or implemented in a stand-alone fashion.

In some embodiments, each of the compute instances (the compute instances 110 and other compute instances) includes a different processor and a different memory. For instance, as shown, the compute instance 110(1) includes, without limitation, a processor 112 and a memory 116. The processor 112 can be any instruction execution system, apparatus, or device capable of executing instructions. For example, the processor 112 could comprise a central processing unit, a graphics processing unit, a controller, a micro-controller, a state machine, or any combination thereof. The memory 116 of the compute instance 110 stores content, such as software applications and data, for use by the processor 112 of the compute instance 110. The memory 116 can be one or more of a readily available memory, such as random-access memory, read only memory, floppy disk, hard disk, or any other form of digital storage, local or remote.

In some embodiments, a storage (not shown) may supplement or replace the memory 116 of the compute instance 110. The storage may include any number and type of external memories that are accessible to the processor 112 of the compute instance 110. For example, and without limitation, the storage can include a Secure Digital Card, an external Flash memory, a portable compact disc read-only memory, an optical storage device, a magnetic storage device, or any suitable combination of the foregoing.

In some other embodiments, each compute instance (e.g., the compute instances 110, other compute instances) can include any number of processors and any number of memories in any combination. In particular, any number of compute instances (including zero or more of the compute instances 110) can provide a multiprocessing environment in any technically feasible fashion.

In general, each compute instance (including each compute instance 110) is configured to implement one or more software applications. For explanatory purposes only, each software application is described as residing in the memory of a single compute instance and executing on the processor of the same compute instance. However, in some embodiments, the functionality of each software application can be distributed across any number of other software applications that reside in the memories of any number of compute instances and execute on the processors of any number of compute instances in any combination. Further, the functionality of any number of software applications can be consolidated into a single software application.

As shown, the live event server 122 relays the live A/V feed 102 to the distribution encoder 160 and concurrently transmits a low-latency A/V feed 124 to the captioning service 126. The live event server 122 can be any type of compute instance or other type of component that is capable of relaying the live A/V feed 102 to the distribution encoder 160, generating the low-latency A/V feed 124, and transmitting the low-latency A/V feed 124 to the captioning service 126.

The live event server 122 can perform any amount and/or types of encoding operations on the live A/V feed 102 in any technically feasible fashion to facilitate transmission to the distribution encoder 160. Importantly, the live event server 122 transmits the live A/V feed 102 independently of any caption data and therefore does not introduce any caption encoding delay into the live A/V feed 102 prior to relaying an optionally encoded version of the live A/V feed 102 to the distribution encoder 160.

The live event server 122 can perform any number and/or types of encoding operations on the live A/V feed 102 in any technically feasible fashion to generate the low-latency A/V feed 124. In some embodiments, the live event server 122 encodes the live A/V feed 102 based on a relatively low bitrate and/or relatively low resolution to generate the low-latency A/V feed 124 having a quality level that is reduced but sufficient for captioning. The live event server 122 generates and relays the low-latency A/V feed 124 to the captioning service 126 independently of and concurrently to optionally encoding and transmitting an optionally encoded version of the live A/V feed 102 to the distribution encoder 160.

The distribution encoder 160 includes, without limitation, any number of compute instances and any number (including none) and/or types of other components. Any number of the components of the distribution encoder 160 can be distributed across multiple geographic locations or implemented in one or more cloud computing environments (e.g., encapsulated shared resources, software, data) in any combination.

Prior to a live event, the distribution encoder 160 determines segment configuration data 132 and transmits the segment configuration data 132 to the caption processing cluster 140. As described previously herein, segments of different streams for the same live event that specify the same segment index correspond to the same time interval. The segment configuration data 132 can include any amount and/or types of data that enable the distribution encoder 160 and the caption processing cluster 140 to consistently map time intervals to segment indices.

As described in greater detail below in conjunction with FIG. 2, in some embodiments, the segment configuration data 132 includes a start time, a segment duration, and a start index. The start time is a wall clock time that coincides with a start time along a playback timeline. In some embodiments, the distribution encoder 160 and the caption processing cluster 140 implement synchronized wall clocks. The segment duration is the duration along the playback timeline of each segment. The start index specifies the segment index for the first segment of each of the streams.

As the distribution encoder 160 receives the live A/V feed 102, the distribution encoder 160 performs distribution encoding on the live A/V feed 102 across different encoding parameters to generate the audio segments 164 and the video segments 166. More specifically, the distribution encoder 160 encodes the live A/V feed 102 across one or more sets of encoding parameters to incrementally generate one or more audio streams and one or more video streams having different characteristics. For instance, in some embodiments, the distribution encoder 160 encodes video content included in the live A/V feed 102 across multiple sets of encoding parameters to generate video streams having different combinations of resolutions and bitrates.

As the distribution encoder 160 generates the audio segments 164 and the video segments 166, the distribution encoder 160 also generates caption notifications 162. More precisely, for each segment index, the distribution encoder 160 generates one or more of audio segments (included in the audio segments 164), one or more video segments (included in the video segments 166), and one or more caption notifications (included in the caption notifications 162) that each indicates the segment index and corresponds to the same source portion of the live A/V feed 102.

Each of the caption notifications 162 can be any type of data, message, file, or the like that indicates a segment index and optionally any amount and/or types of additional metadata (e.g., a language, a caption type), in any technically feasible fashion. In the same or other embodiments, a name of each of the caption notifications 162 indicates a corresponding segment index and optionally any amount and/or types of additional metadata.

For instance in some embodiments, each of the caption notifications 162 is an empty caption segment that indicates both a segment index and a language. In the same or other embodiments, the name of each empty caption segment indicates both the segment index and the language.

The distribution encoder 160 can generate the caption notifications 162 in any technically feasible fashion. For instance, in some embodiments, because the distribution encoder 160 does not receive any caption data, the distribution encoder 160 automatically generates empty caption segments that serve as the caption notifications 162. In operation, as the distribution encoder 160 generates one or more audio segments and one or more video segments indicating a segment index, the distribution encoder 160 automatically generates one or more empty caption segments indicating the same segment index. In some embodiments, the distribution encoder 160 ensures that multiple empty caption segments that indicate the same segment index also indicate different metadata that identify different caption streams.

As the distribution encoder 160 generates the audio segments 164, the video segments 166, and the caption notifications 162, the distribution encoder 160 transmits the audio segments 164, the video segments 166, and the caption notifications 162 to the segment load balancing server 170.

As the segment load balancing server 170 receives the audio segments 164 and the video segments 166, the segment load balancing server 170 relays the audio segments 164 and the video segments 166 to the packager 180. As described previously herein, in response, the packager 180 prepares the audio segments 164 and the video segments 166 for distribution to one or more client devices.

In this fashion, the distribution encoder 160 causes one or more audio streams to be generated based on the audio segments 164 and one or more video streams to be generated based on the video segments 166. As described previously herein, the one or more audio streams and the one or more video streams are to be transmitted as part of the live event.

In contrast, as the segment load balancing server 170 receives the caption notifications 162, the segment load balancing server 170 distributes the caption notifications 162 across the compute instances 110 included in the caption processing cluster 140. The segment load balancing server 170 can implement any number and/or types of load balancing algorithms to distribute the caption notifications 162 across the compute instances 110 included in the caption processing cluster 140.

As described in greater detail below, as the caption processing cluster 140 receives the caption notifications 162, the caption processing cluster 140 generates caption segments 152. More specifically, in response to receiving a caption notification, the caption processing cluster 140 generates a corresponding caption segment based on a corresponding portion of caption data 128 previously generated by the captioning service 126.

As the caption processing cluster 140 generates the caption segments 152, the caption processing cluster 140 transmits the caption segments 152 to the segment load balancing server 170. As the segment load balancing server 170 receives the caption segments 152, the segment load balancing server 170 relays the caption segments 152 to the packager 180. As described previously herein, the packager 180 prepares the caption segments 152 for distribution to one or more client devices via the CDN 190.

In this fashion, the caption processing cluster 140 causes one or more caption streams to be generated based on the caption segments 152. More specifically, when the caption processing cluster 140 transmits a caption segment to the packager 180 via the segment load balancing server 170, the caption processing cluster 140 causes that caption segment to be inserted into a caption stream at a segment index indicated by that caption segment. As described previously herein, the caption stream is to be transmitted via the CDN 190 as part of the live event.

As shown, the captioning service 126 incrementally generates the caption data 128 based on the low-latency A/V feed 124. The captioning service 126 can implement any number and/or types of caption encoding or "captioning" techniques to convert audio data and optionally video data included in the low-latency A/V feed 124 into the caption data 128. The caption encoding techniques can include any number of automated caption encoding techniques, any number of manual caption encoding techniques, or any combination thereof.

The caption data 128 can include, without limitation, any amount and types of textual data that a client device can display while playing back corresponding video and audio data to a user and optionally any amount and/or types of metadata. For instance, in some embodiments, the caption data 128 can include subtitles, closed captions, forced narratives, or any combination thereof for any number of different languages. For explanatory purposes, subtitles, closed captions, and forced narratives are also referred to herein individually as a "caption" and collectively as "captions." In the same or other embodiments, the caption data 128 can include any amount and/or types of metadata that indicate the language and/or caption type of each of any number of discrete portions of caption data 128 in any technically feasible fashion.

Advantageously, in some embodiments, neither the live event server 122 nor the captioning service 126 rely on hardware caption encoders. Relative to prior art techniques, the encoding subsystem 120 can therefore support additional, more flexible caption standards. For instance, in some embodiments, the encoding subsystem 120 can support live captioning for any number and/or types of languages, including any combination of Latin languages and non-Latin languages. Relative to prior art techniques, the encoding subsystem 120 can therefore enable the system 100 to perform live captioning for a larger number of Latin and/or non-Latin languages when streaming live events.

As shown, as the captioning service 126 generates the caption data 128, the captioning service 126 transmits the caption data 128 to the caption load balancing server 130. The caption load balancing server 130 can implement any number and/or types of load balancing algorithms to distribute the caption data 128 across the compute instances 110 that are included in the caption processing cluster 140. Accordingly, each of the compute instances 110 can receive any number of "delegated" portions of caption data 128. Each delegated portion of caption data 128 can include any number captions and any amount and/or types of metadata specifying characteristics (e.g., languages, caption type) of the captions.

As described previously herein, the caption processing cluster 140 includes, without limitation, the compute instances 110. A different instance of a caption encoding application 150 resides in the memory of each of the compute instances 110 and executes on the processor of each of the compute instances 110. For instance, as shown, an instance of the caption encoding application 150 resides in the memory 116 of the compute instance 110(1) and executes on the processor 112 of the compute instance 110(1). For explanatory purposes instances of the caption encoding application 150 are also referred to herein individually and collectively as "the caption encoding application 150."

Prior to the live event, the caption processing cluster 140 receives the segment configuration data 132 from the distribution encoder 160 and establishes a caption delay (not shown in FIG. 1). In some embodiments, the segment configuration data 132 and the caption delay is provided to each instance of the caption encoding application 150 executing within the caption processing cluster 140.

The caption delay is a delay that is used to synchronize audio and video segments with caption segments to enable live captioning. In that regard, the amount of time required to perform caption encoding for a given portion of a live audio/video feed is usually less than the amount of time required to perform distribution encoding for that same portion of live audio/video feed. The caption delay is the amount of time that elapses between when a portion of the caption data 128 corresponding to a segment index is received by the caption processing cluster 140 and a caption notification indicating the same segment index is received by the caption processing cluster 140. The caption delay can be determined in any technically feasible fashion.

For instance, in some embodiments, prior to a live event, the caption delay is computed based on a first delay associated with generating caption data via the captioning service 126 and a second delay associated with encoding video data via the distribution encoder 160. For explanatory purposes, as used herein, a delay associated with generating caption data refers to a delay or latency incurred when generating a portion of caption data based on a portion of video data and/or a portion of audio data. As used herein, a delay associated with encoding video data refers to a delay or latency incurred when performing any number and/types of encoding (e.g., contribution encoding) on a portion of video data.

In operation, in some embodiments, a test A/V feed is input into the live event server 122 prior to a live event. The caption delay is computed based on one or more delays associated with encoding a portion of video data included in the test A/V feed via the distribution encoder 160 and one or more delays associated with generating a portion of caption data that correspond to that portion of video data via the captioning service 126.

In the same or other embodiments, the caption delay is set equal to the difference between an overall audio/video encoding delay and an overall captioning delay. The overall audio/video encoding delay includes, without limitation, a transmission delay from the live event server 122 to the distribution encoder 160, a distribution encoding delay, and a transmission delay from the distribution encoder 160 to the caption processing cluster 140. The overall captioning delay includes, without limitation, a transmission delay from the live event server 122 to the captioning service 126, a captioning delay, and a transmission delay from the captioning service 126 to the caption processing cluster 140.

As shown, during the live event, the caption processing cluster 140 generates the caption segments 152 based on the caption data 128, the caption notifications 162, the segment configuration data 132, and the caption delay. As described in greater detail below in conjunction with FIG. 2, at the start of the live event, each instance of the caption encoding application 150 launches both an intake process and a monitor process that execute in the background throughout the live event.

The intake process executing on each compute instance 110 attaches or otherwise assigns one or more timestamps to each "delegated" portion of the caption data 128 that the caption load balancing server 130 routes to that compute instance 110. The intake process then stores the delegated portion of the caption data 128 (and the attached timestamp(s)) in the database 142. In that regard, the intake process can assign timestamp(s) to any types of text elements included in each delegated portion of caption data 128. Some examples of text elements are characters, words, and captions. As the caption encoding application 150 receives each text element, the intake process attaches or otherwise assigns a timestamp to that text element, where the timestamp is metadata indicating an elapsed time (e . . . , a wall clock time) at which the caption encoding application 150 received that text element.

The monitoring process executing on each compute instance 110 detects triggering events (not shown in FIG. 1) associated with the live event and delegated to that compute instance 110. A triggering event can be any type of event indicating that one or more new caption segments are to be generated. In some embodiments, a triggering event associated with the live event is receiving a caption notification associated with the live event from the segment load balancing server 170. When the monitoring process included in an instance of the caption encoding application 150 detects a new triggering event, that instance of the caption encoding application 150 generates a new caption segment based on that triggering event, the caption delay, and the database 142.

In some embodiments, the caption encoding application 150 determines a segment index and a language in response to a triggering event associated with a live event. The caption encoding application 150 can determine the segment index and the language in any technically feasible fashion. If the triggering event is receiving an empty caption segment, then the caption encoding application 150 determines both the segment index and the language based on the empty caption segment. In some embodiments, the caption encoding application 150 sets the segment index and the language equal to a segment index and a language, respectively, indicated by the empty caption segment.

The caption encoding application 150 computes a caption time interval based on a time at which the triggering event occurred, the caption delay, and the segment duration specified in the segment configuration data 132. The caption encoding application 150 sets a start time of the caption time interval based on a time (e.g., a wall-clock time) at which the first triggering event occurred and the caption delay. For instance, in some embodiments, the caption encoding application 150 subtracts the caption delay from the time at which the first triggering event occurred to compute the start time of the caption time interval. The caption encoding application 150 sets an end time of the caption time interval equal to a sum of the start time of the caption time interval and the segment duration.

The caption encoding application 150 retrieves from the database 142 a portion of the caption data 128 based on the caption time interval and the language. In operation, the caption encoding application 150 retrieves the portion of the caption data 128 that corresponds to both the caption time interval and the language as per metadata that is attached or otherwise assigned to the portion of the caption data 128. Notably, the retrieved portion of the caption data 128 corresponds to the segment index associated with the triggering event.

In general, prior to a triggering event that causes an instance of the caption encoding application 150 to generate a caption segment specifying a segment index, either the same instance of the caption encoding application 150 or a different instance of the caption encoding application 150 stores a portion of the caption data 128 corresponding to that segment index in the database 142.

The caption encoding application 150 generates a new caption segment based on the retrieved portion of the caption data 128. The new caption segment includes the retrieved portion of the caption data 128 and indicates the segment index, the language, and optionally any other relevant metadata, such as a caption type, in any technically feasible fashion.

For instance, in some embodiments, the caption encoding application 150 names the new caption segment based on the segment index, the language, and optionally the caption type. In the same or other embodiments, the caption encoding application 150 adds the retrieved portion of the caption data 128 to an empty caption segment generated by the distribution encoder 160 to generate a new caption segment having the same name as that empty caption segment.

The caption encoding application 150 transmits the new caption segment to the segment load balancing server 170. As described previously herein, transmitting the new caption segment to the segment load balancing server 170 causes the new caption segment to be inserted into a caption stream at the segment index. The packager 180 ensures that the caption stream into which the new caption segment is inserted corresponds to the language and the optional caption type indicated by the new caption segment.

Advantageously, unlike prior art techniques, the encoding subsystem 120 performs caption encoding and distribution encoding concurrently instead of sequentially. As a result, caption encoding is effectively removed from the critical path of streaming a live event, and overall live streaming latency can therefore be substantially reduced relative to prior art techniques.

Please note that the techniques described herein are illustrative rather than restrictive and can be altered without departing from the broader spirit and scope of the embodiments. Many modifications and variations on the functionality of the packager 180, the CDN 190, the origin server 182, the client device 198, the encoding subsystem 120, the live event server 122, the captioning service 126, the caption load balancing server 130, the caption processing cluster 140, the distribution encoder 160, the segment load balancing server 170, the caption encoding application 150, and the database 142 as described herein will be apparent to those of ordinary skill in the art without departing from the scope and spirit of the described embodiments.

Similarly, the storage, organization, amount, and/or types of data described herein are illustrative rather than restrictive and can be altered without departing from the broader spirit and scope of the embodiments. In that regard, many modifications and variations on the caption notifications 162, the caption segments 152, the audio segments 164, the video segments 166, the caption data 128, and the segment configuration data 132 as described herein will be apparent to those of ordinary skill in the art without departing from the scope and spirit of the described embodiments.

For instance, in some embodiments, the live event server 122 transmits an audio portion of the live A/V feed 102 to the captioning service 126 instead of generating and transmitting low-latency A/V feed 104 to the captioning service 126. In the same or other embodiments, the captioning service 126 attaches timestamps to portions of the caption data 128, and the techniques described herein are modified accordingly.

In some embodiments, a triggering event can be receiving any other type of caption notification (e.g., a message from the segment load balancing server) instead of an empty caption segment. In some other embodiments, the caption encoding application 150 maintains a target time throughout a live event, and a triggering event can be determining that an elapsed time is equal to a target time. The target time is initially computed based on the segment configuration data 132. After each triggering event, the caption encoding application 150 computes a new target time based on a segment duration included in the segment configuration data 132.

In some embodiments, the caption load balancing server 130 and the segment load balancing server 170 are omitted from the system 100. In some other embodiments, the segment load balancing server 130 is replaced with two different load balancing servers, where one of the load balancing servers handles the caption notifications 162 and the other load balancing server handles the audio segments 164 and the video segments 166.

In some embodiments, the caption processing cluster 140 is replaced with a single compute instance that executes a single instance of the caption encoding application 150. In some other embodiments, each instance of the caption encoding application 150 is responsible for generating caption segments for a different subset of caption streams associated with a live event. In the same or other embodiments, the encoding subsystem 120 can generate audio segments, video segments, and caption segments for any number of caption streams based on any number of live A/V feeds associated with any number of live events.

It will be appreciated that the system 100 shown herein is illustrative and that variations and modifications are possible. For example, the functionality provided by the packager 180, the CDN 190, the origin server 182, the client device 198, the encoding subsystem 120, the live event server 122, the captioning service 126, the caption load balancing server 130, the caption processing cluster 140, the distribution encoder 160, the segment load balancing server 170, the caption encoding application 150, and the database 142 as described herein can be integrated into or distributed across any number of software applications (including one), and any number of components of the system 100. Further, the connection topology between the various units in FIG. 1 can be modified as desired.

Synchronizing Caption Streams to Audio Streams and Video Streams

Figure 2:
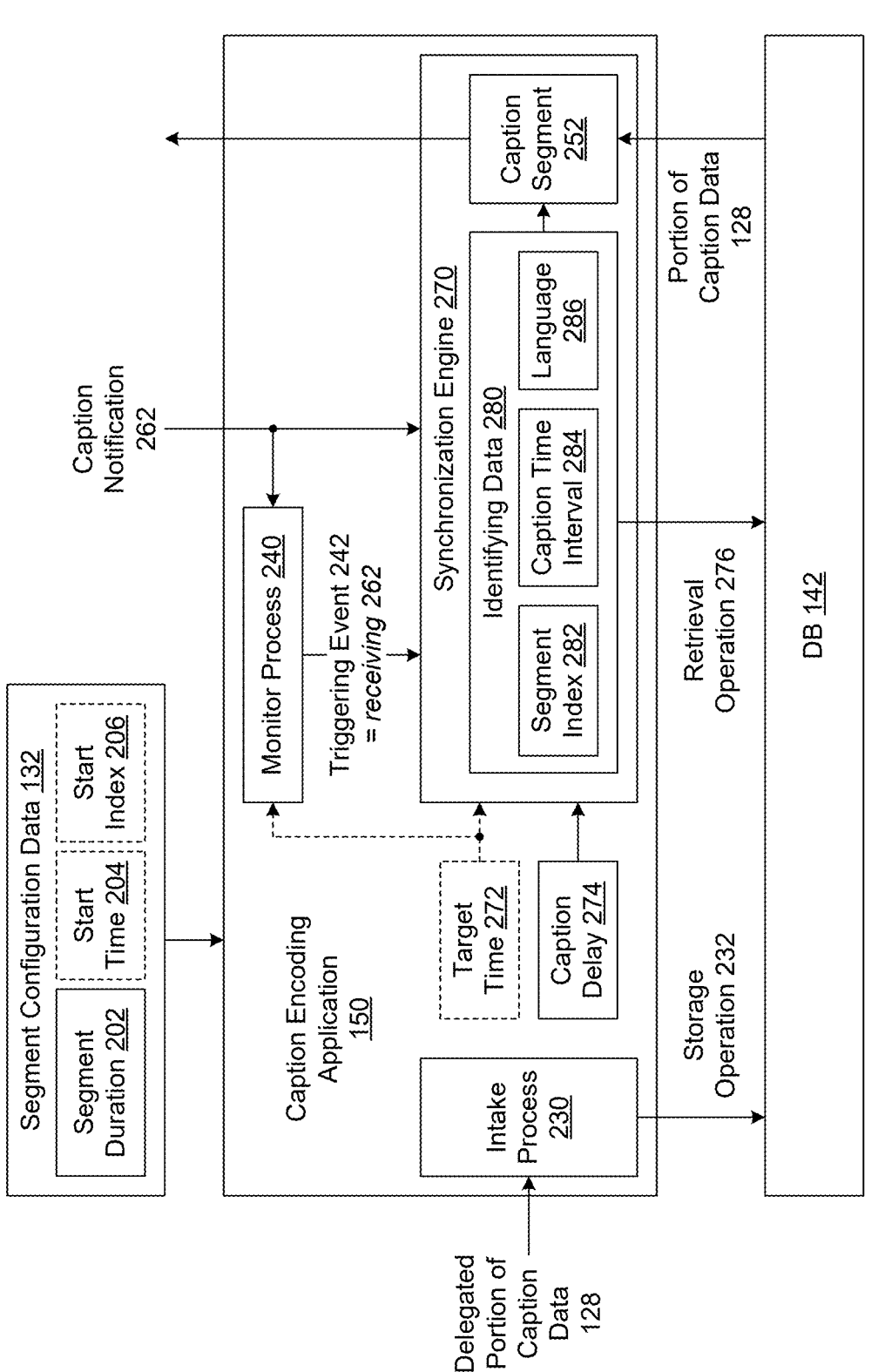
FIG. 2 is a more detailed illustration of the caption encoding application of FIG. 1, according to various embodiments.

FIG. 2 is a more detailed illustration of the caption encoding application 150 of FIG. 1, according to various embodiments. As described previously herein in conjunction with FIG. 1, in some embodiments, the caption encoding application 150 generates caption segments in response to triggering events. In the same or other embodiments, each triggering event is receiving a different caption notification that indicates both a segment index and a language.

For explanatory purposes, the functionality of the caption encoding application 150 described in conjunction with FIG. 2 in the context of a single instance of the caption encoding application 150 that is performing live captioning for a live event during an exemplary period of time in conjunction with zero or more other instances of the caption encoding application 150. During the exemplary period of time, the caption encoding application 150 receives a delegated portion of caption data 128 from the caption load balancing server 130 and receives a caption notification 262 from the segment load balancing server 170.

As shown, the caption encoding application 150 includes, without limitation, a caption delay 274, an intake process 230, a monitor process 240, and a synchronization engine 270. Prior to the live event, the caption encoding application 150 receives the segment configuration data 132. The segment configuration data 132 specifies any amount and/or types of data relevant to synchronizing caption segments 152 with audio segments 164 and video segments 166. As shown, in some embodiments, the segment configuration data 132 includes, without limitation, a segment duration 202. The segment duration 202 indicates a duration of each segment of each stream associated with the live event.

As depicted with dashed boxes, in some embodiment, the segment configuration data 132 also includes a start time 204 and a start index 206. The start time 204 is a start time of the live event as per a wall clock (not shown) that is synchronized with the distribution encoder 160. The start index 206 is a segment index (e.g., 1) that corresponds to an initial source portion of the live A/V feed 102.

Also prior to the live event, the caption processing cluster 140 sets the caption delay 274 equal to an amount of time that elapses between when a portion of the caption data 128 corresponding to a segment index is received by the caption encoding application 150 and a caption notification indicating the same segment index is received by the caption encoding application 150. As described previously herein in conjunction with FIG. 1, the caption delay 274 can be determined in any technically feasible fashion.

As shown, at the start of the live event, the caption encoding application 150 launches the intake process 230 and the monitor process 240. The intake process 230 and the monitor process 240 execute in the background throughout the live event. The intake process 230 timestamps and then stores in the database 142 each portion of caption data 128 received by the caption encoding application 150. The monitor process 240 detects triggering events. For explanatory purposes, in the embodiment depicted in FIG. 2, each triggering event is a different caption notification received by the caption encoding application 150. The synchronization engine 270 generates a new caption segment in response to each triggering event.

As shown, during the exemplary period of time, the caption encoding application 150 receives the delegated portion of caption data 128. In response, the intake process 230 attaches or otherwise assigns one or more timestamps to the delegated portion of caption data 128. The intake process 230 can assign timestamp(s) to any types of text elements included in the delegated portion of caption data 128. Some examples of elements of text elements are characters, words, and captions. Each timestamp is metadata indicating an elapsed time at which the caption encoding application 150 received that text element. The intake process 230 determines the elapsed time based on a wall clock (not shown) that is synchronized with the distribution encoder 160.

The intake process 230 then performs a storage operation 232 on the database 142 to store the delegated portion of the caption data 128 along with the attached timestamp(s) in the database 142. As described previously herein, metadata previously attached to the delegated portion of the caption data 128 by the captioning service 126 indicates one or more language(s) and optionally one or more caption types.

As shown, during the exemplary period of time, the caption encoding application 150 receives the caption notification 262. In response, the monitor process 240 detects the triggering event 242. As described previously herein, the caption notification 262 indicates both a segment index and a language in any technically feasible fashion. In some embodiments, the caption notification 262 is an empty caption segment and the name of the empty caption segment indicates both the segment index and the segment language.

The synchronization engine 270 generates the caption segment 252 based on the triggering event 242, the caption delay 274, the segment configuration data 132, and the database 142. The synchronization engine 270 includes, without limitation, identifying data 280 and caption segment 252. The identifying data 280 enables the synchronization engine 270 to retrieve from the database 142 a portion of caption data 128 corresponding to the triggering event 242.

As shown, the identifying data 280 includes, without limitation, a segment index 282, a caption time interval 284, and a language 286. The synchronization engine 270 sets the segment index 282 equal to the segment index indicated by the caption notification 262. The synchronization engine 270 sets the language 286 equal to the language indicated by the caption notification 262.

The synchronization engine 270 determines a trigger time (not shown) at which the triggering event 242 occurred based on a wall clock that is synchronized with the distribution encoder 160. Accordingly, the trigger time is the time as per the wall clock at which the caption encoding application 150 received the caption notification 262. The synchronization engine 270 subtracts the caption delay 274 from the trigger time to compute the start time of the caption time interval 284. The synchronization engine 270 sets an end time of the caption time interval 284 equal to a sum of the start time of the caption time interval 284 and the segment duration 202.

The synchronization engine 270 executes a retrieval operation 276 on the database 142 based on the caption time interval 284 and the language 286 to retrieve a portion of the caption data 128 that corresponds to both the segment index 282 and the language 286. The synchronization engine 270 and/or the database 142 can perform any number and/or types of search operations, any number and/or types of comparison operations, any number and/or types of other operations, or any combination thereof on metadata stored in the database 142 to select the proper portion of the caption data 128 for retrieval.

As shown, the synchronization engine 270 generates the caption segment 252 based on the identifying data 280 and the portion of caption data 128 retrieved from the database 142. The caption segment 252 includes the retrieved portion of the caption data 128 and indicates the segment index 282 and the language 286 in any technically feasible fashion. For instance, in some embodiments, the synchronization engine 270 names the caption segment 252 based on the segment index 282 and the language 286.

The synchronization engine 270 transmits the caption segment 252 to the segment load balancing server 170. As described previously herein, transmitting the caption segment 252 to the segment load balancing server 170 causes the caption segment 252 to be inserted into a caption stream at the segment index 282, where the caption stream corresponds to the language 286.

Please note that the techniques described herein are illustrative rather than restrictive and can be altered without departing from the broader spirit and scope of the embodiments. Many modifications and variations on the functionality of the caption encoding application 150, the intake process 230, the monitor process 240, the synchronization engine 270, and the database 142 as described herein will be apparent to those of ordinary skill in the art without departing from the scope and spirit of the described embodiments.

For instance, as noted previously herein in conjunction with FIG. 1 and as depicted via dashed boxes and dashed lines in FIG. 2, in some alternate embodiments, the caption encoding application 150 detects triggering events based on a target time 272. Prior to the live event, the caption encoding application 150 sets the segment index 282 equal to the start index 206 and sets the target time 272 equal to the sum of the start time 204, the segment duration 202, and an overall audio/video encoding delay (not shown). During the live event, whenever a wall clock (not shown) that is synchronized with the distribution encoder 160 indicates that an elapsed time is equal to the target time 272, the monitor process 240 detects a new triggering event. The caption encoding application 150 generates a new segment indicating the segment index 282 as described previously herein. The caption encoding application 150 generates one or more new segments indicating the segment index 282 as described previously herein, where each new segment indicates a different language. The caption encoding application 150 increments the segment index 282 by one and increments the target time 272 by the segment duration 202. The caption encoding application 150 continues to generate new caption segments in this fashion until the live event is complete.

Figure 3:
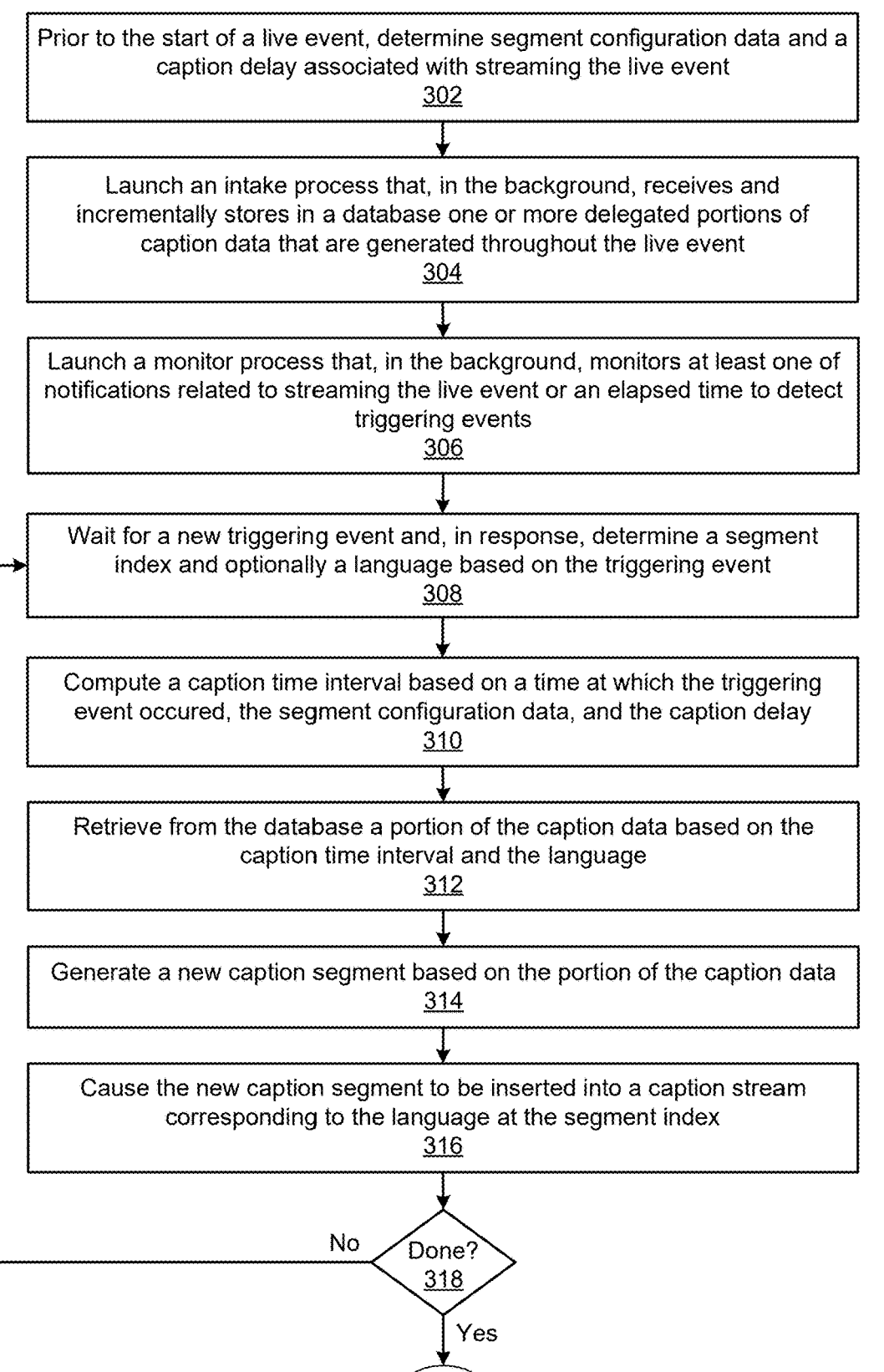
FIG. 3 is a flow diagram of method steps for performing live captioning, according to various embodiments.

FIG. 3 is a flow diagram of method steps for performing live captioning, according to various embodiments. Although the method steps are described with reference to the systems of FIGS. 1-2, persons skilled in the art will understand that any system configured to implement the method steps, in any order, falls within the scope of the embodiments.

As shown, a method 300 begins at step 302, where, prior to the start of a live event, the caption encoding application 150 determines segment configuration data 132 and caption delay 274 associated with streaming the live event. At step 304, the caption encoding application 150 launches intake process 230 that, in the background, receives and incrementally stores in database 142 one or more delegated portions of caption data 128 that are generated throughout the live event. At step 306, the caption encoding application 150 launches monitor process 240 that, in the background, monitors at least one of notifications related to streaming the live event or an elapsed time to detect triggering events.

At step 308, the caption encoding application 150 waits for a new triggering event and, in response, determines a segment index and optionally a language based on the new triggering event. At step 310, the caption encoding application 150 computes a caption time interval based on a time at which the triggering event occurred, the segment configuration data 132, and the caption delay 274.

At step 312, the caption encoding application 150 retrieves from database 142 a portion of the caption data 128 based on the caption time interval and the language. At step 314, the caption encoding application 150 generates a new caption segment based on the portion of the caption data. At step 316, the caption encoding application 150 causes the new caption segment to be inserted into a caption stream corresponding to the language at the segment index. The caption stream is to be transmitted as part of the live event.

At step 318, the caption encoding application 150 determines whether the streaming of the live event is done. If, at step 318, the caption encoding application 150 determines that the streaming of the live event is not done, then the method 300 returns to step 308, where the caption encoding application 150 waits for a new triggering event and, in response, determines a segment index and a language based on the new triggering event.

If, however, at step 318, the caption encoding application 150 determines that the streaming of the live event is done, then the method 300 terminates. Notably, any number of instances (including one) of the caption encoding application 150 can execute steps 308-318 for different combinations of language and/or caption types concurrently to generate segments of different caption streams.

In sum, the disclosed techniques can be used to perform live captioning when streaming live events. In some embodiments, each compute instance in a caption processing cluster executes a different instance of a caption encoding application. A caption load balancing server delegates caption data received from a captioning service to compute instances in the caption processing cluster. A segment load balancing server delegates caption notifications received from a distribution encoder to different instances in the caption processing cluster. In some embodiments, a caption notification is an empty caption segment indicating a segment index and a language. When the distribution encoder generates and transmits to the segment load balancing server audio and video segments indicating a segment index, the distribution encoder also generates and transmits to the segment load balancing server one or more caption notifications indicating the same segment index but different languages. The segment load balancing server relays to a packager video segments and audio segments received from the distribution encoder as well as caption segments received from the caption processing cluster.

Prior to a start of a live event, a caption delay included in each instance of the caption encoding application is set to a time difference between when an instance of the caption encoding application receives a portion of the caption data corresponding to a segment index and when the same or a different caption encoding application receives a caption notification indicating the same segment index. Each instance of the caption encoding application launches both an intake process and a monitor process that execute in the background throughout the live event. The intake process executing on each compute instance stores in a database each delegated portion of the caption data that the caption load balancing server routes to the compute instance. As each portion of the caption data is stored in the database, the portion of the caption data is automatically annotated with a timestamp indicating when the portion of caption data was received by the caption encoding application. The monitoring process executing on each compute instance detects a new triggering event whenever the segment load balancing server routes a caption notification to the compute instance.

When the monitoring process detects a new triggering event associated with the live event, the caption encoding application determines a corresponding segment index and a corresponding language based on the triggering event. The caption encoding application computes a caption time interval based on the time at which the triggering event occurred, a segment duration, and the caption delay. The caption encoding application retrieves from a database a portion of the caption data that corresponds to both the caption time interval and the language. The caption encoding application generates a caption segment indicating both the language and the segment index based on the portion of the caption data. The caption encoding application then transmits the caption segment to the segment load balancing server, thereby causing the packager to insert the caption segment into a caption stream corresponding to the language.

At least one technical advantage of the disclosed techniques relative to the prior art is that, with the disclosed techniques, caption encoding and distribution encoding are performed concurrently instead of sequentially, which can substantially reduce overall live streaming latency. Notably, the amount of time required to perform caption encoding for a given portion of a live audio/video feed is usually less than the amount of time required to perform distribution encoding for that same portion of live audio/video feed. Accordingly, with the disclosed techniques, caption encoding can be effectively removed from the critical path of streaming a live event, thereby reducing live streaming latency relative to the latencies experienced using prior art techniques. Another technical advantage of the disclosed techniques relative to the prior art is that the disclosed techniques do not rely on hardware caption encoders and can therefore support additional, more flexible caption standards. As a result, with the disclosed techniques, live captioning can be performed for a larger number of Latin and/or non-Latin languages when streaming live events. These technical advantages provide one or more technological advancements over prior art approaches.

1. In some embodiments, a computer-implemented method for performing captioning while streaming live events comprises determining a first segment index in response to a first triggering event associated with a first live event; computing a first caption time interval based on the first triggering event and a first caption delay; retrieving from a database a first portion of caption data based on the first caption time interval and a first language; generating a first caption segment based on the first portion of the caption data; and causing the first caption segment to be inserted into a first caption stream at the first segment index, wherein the first caption stream is to be transmitted as part of the first live event.

2. The computer-implemented method of clause 1, wherein the first triggering event comprises receiving a first caption notification or determining that a first elapsed time is equal to a first target time.

3. The computer-implemented method of clauses 1 or 2, wherein the first caption notification comprises an empty caption segment that indicates both the first segment index and the first language.

4. The computer-implemented method of any of clauses 1-3, wherein a name of the first caption notification indicates both the first segment index and the first language.

5. The computer-implemented method of any of clauses 1-4, wherein generating the first caption segment comprises naming the first caption segment based on the first segment index.

6. The computer-implemented method of any of clauses 1-5, wherein causing the first caption to be inserted into the first caption stream comprises transmitting the first caption segment to a server that prepares the first caption segment for distribution to one or more client devices.

7. The computer-implemented method of any of clauses 1-6, further comprising storing the first portion of the caption data in the database prior to the first triggering event.

8. The computer-implemented method of any of clauses 1-7, wherein the first caption delay is set equal to a difference between an overall audio/video encoding delay and an overall captioning delay.

9. The computer-implemented method of any of clauses 1-8, wherein computing the first caption time interval comprises determining a start time of the first caption time interval based on a time at which the first triggering event occurred and the first caption delay.

10. The computer-implemented method of any of clauses 1-9, wherein the first language comprises a non-Latin language.

11. In some embodiments, one or more non-transitory computer readable media include instructions that, when executed by one or more processors, cause the one or more processors to perform captioning while streaming live events by performing the steps of determining a first segment index in response to a first triggering event associated with a first live event; computing a first caption time interval based on the first triggering event and a first caption delay; retrieving from a database a first portion of caption data based on the first caption time interval and a first language; generating a first caption segment based on the first portion of the caption data; and causing the first caption segment to be inserted into a first caption stream at the first segment index, wherein the first caption stream is to be transmitted as part of the first live event.

12. The one or more non-transitory computer readable media of clause 11, wherein the first triggering event comprises receiving a first caption notification or determining that a first elapsed time is equal to a first target time.

13. The one or more non-transitory computer readable media of clauses 11 or 12, further comprising computing the first target time based on a segment duration.

14. The computer-implemented method of any of clauses 11-13, further comprising determining both the first segment index and the first language based on the first caption notification.

15. The one or more non-transitory computer readable media of any of clauses 11-14, wherein generating the first caption segment comprises naming the first caption segment based on the first segment index.

16. The one or more non-transitory computer readable media of any of clauses 11-15, wherein causing the first caption to be inserted into the first caption stream comprises transmitting the first caption segment to a server that prepares the first caption segment for distribution to one or more client devices.

17. The one or more non-transitory computer readable media of any of clauses 11-16, further comprising storing the first portion of the caption data in the database prior to the first triggering event.

18. The one or more non-transitory computer readable media of any of clauses 11-17, wherein the first caption delay is computed based on one or more delays associated with encoding a portion of video data and one or more delays associated with generating a second portion of second caption data that corresponds to the portion of the video data.

19. The one or more non-transitory computer readable media of any of clauses 11-18, wherein computing the first caption time interval comprises determining a start time of the first caption time interval based on a time at which the first triggering event occurred and the first caption delay.

20. In some embodiments, a system comprises one or more memories storing instructions and one or more processors coupled to the one or more memories that, when executing the instructions, perform the steps of determining a first segment index in response to a first triggering event associated with a first live event; computing a first caption time interval based on the first triggering event and a first caption delay; retrieving from a database a first portion of caption data based on the first caption time interval and a first language; generating a first caption segment based on the first portion of the caption data; and causing the first caption segment to be inserted into a first caption stream at the first segment index, wherein the first caption stream is to be transmitted as part of the first live event.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory, Flash memory, an optical fiber, a portable compact disc read-only memory, an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for performing captioning while streaming live events, the method comprising:
    determining a first segment index in response to a first triggering event associated with a first live event, the first triggering event being received from a distribution encoder encoding audio/video data associated with the first segment index;
    computing a first caption time interval based on the first triggering event and a first caption delay;
    retrieving from a database a first portion of caption data based on the first caption time interval and a first language;
    generating a first caption segment based on the first portion of the caption data; and
    causing the first caption segment to be inserted into a first caption stream at the first segment index, wherein the first caption stream is to be transmitted as part of the first live event.

2. The computer-implemented method of claim 1, wherein the first triggering event comprises receiving a first caption notification or an indication that a first elapsed time is equal to a first target time.

3. The computer-implemented method of claim 2, wherein the first caption notification comprises an empty caption segment that indicates both the first segment index and the first language.

4. The computer-implemented method of claim 2, wherein a name of the first caption notification indicates both the first segment index and the first language.

5. The computer-implemented method of claim 1, wherein generating the first caption segment comprises naming the first caption segment based on the first segment index.

6. The computer-implemented method of claim 1, wherein causing the first caption to be inserted into the first caption stream comprises transmitting the first caption segment to a server that prepares the first caption segment for distribution to one or more client devices.

7. The computer-implemented method of claim 1, further comprising storing the first portion of the caption data in the database prior to the first triggering event.

8. The computer-implemented method of claim 1, wherein the first caption delay is set equal to a difference between an overall audio/video encoding delay and an overall captioning delay.

9. The computer-implemented method of claim 1, wherein computing the first caption time interval comprises determining a start time of the first caption time interval based on a time at which the first triggering event occurred and the first caption delay.

10. The computer-implemented method of claim 1, wherein the first language comprises a non-Latin language.

11. One or more non-transitory computer readable media including instructions that, when executed by one or more processors, cause the one or more processors to perform captioning while streaming live events by performing the steps of:
    determining a first segment index in response to a first triggering event associated with a first live event, the first triggering event being received from a distribution encoder encoding audio/video data associated with the first segment index;
    computing a first caption time interval based on the first triggering event and a first caption delay;
    retrieving from a database a first portion of caption data based on the first caption time interval and a first language;
    generating a first caption segment based on the first portion of the caption data; and
    causing the first caption segment to be inserted into a first caption stream at the first segment index, wherein the first caption stream is to be transmitted as part of the first live event.

12. The one or more non-transitory computer readable media of claim 11, wherein the first triggering event comprises receiving a first caption notification or an indication that a first elapsed time is equal to a first target time.

13. The one or more non-transitory computer readable media of claim 12, further comprising computing the first target time based on a segment duration.

14. The computer-implemented method of claim 2, further comprising determining both the first segment index and the first language based on the first caption notification.

15. The one or more non-transitory computer readable media of claim 11, wherein generating the first caption segment comprises naming the first caption segment based on the first segment index.

16. The one or more non-transitory computer readable media of claim 11, wherein causing the first caption to be inserted into the first caption stream comprises transmitting the first caption segment to a server that prepares the first caption segment for distribution to one or more client devices.

17. The one or more non-transitory computer readable media of claim 11, further comprising storing the first portion of the caption data in the database prior to the first triggering event.

18. The one or more non-transitory computer readable media of claim 11, wherein the first caption delay is computed based on one or more delays associated with encoding a portion of video data and one or more delays associated with generating a second portion of second caption data that corresponds to the portion of the video data.

19. The one or more non-transitory computer readable media of claim 11, wherein computing the first caption time interval comprises determining a start time of the first caption time interval based on a time at which the first triggering event occurred and the first caption delay.

20. A system comprising:
    one or more memories storing instructions; and
    one or more processors coupled to the one or more memories that, when executing the instructions, cause the one or more processors to perform captioning while streaming live events, by performing the steps of:
        determining a first segment index in response to a first triggering event associated with a first live event, the first triggering event being received from a distribution encoder encoding audio/video data associated with the first segment index;

computing a first caption time interval based on the first triggering event and a first caption delay;

retrieving from a database a first portion of caption data based on the first caption time interval and a first language;

generating a first caption segment based on the first portion of the caption data; and causing the first caption segment to be inserted into a first caption stream at the first segment index, wherein the first caption stream is to be transmitted as part of the first live event.

\* \* \* \* \*